United States Patent Office
3,158,605
Patented Nov. 24, 1964

3,158,605
2,19-CYCLO-DERIVATIVES OF CORTICAL HORMONES
Alexander D. Cross, Mexico City, Mexico, assignor to Syntex Corporation, Panama, Panama, a corporation of Panama
No Drawing. Filed Oct. 19, 1962, Ser. No. 231,829
20 Claims. (Cl. 260—239.55)

The present invention relates to novel cyclopentanophenanthrene derivatives and to a process for the production thereof.

More particularly the present invention relates to novel 2,19-cyclo-derivatives of cortical hormones.

The novel compounds of the present invention are represented by the following formula:

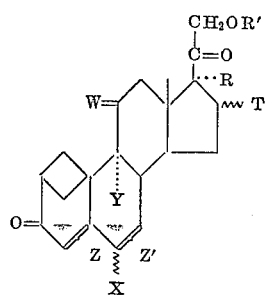

In the above formula Y represents hydrogen, fluorine or chlorine; W represents a β-hydroxyl group or a keto group; X represents hydrogen, fluorine or chlorine all having α or β-configurations; Z represents a double bond or a saturated linkage between C–4 and C–5; $Z^1$ represents a double bond or a saturated linkage between C–6 and C–7; when Z is a saturated linkage $Z^1$ is also a saturated linkage; R represents a hydroxyl group; T represents hydrogen, α-hydroxyl, α-acyloxy, α-methyl or β-methyl; T and R together represent the group

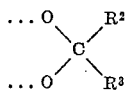

in the 16α,17α-positions wherein $R^2$ and $R^3$ each represents hydrogen or a hydrocarbon residue of up to 8 carbon atoms of straight, branched, cyclic or mixed cyclic aliphatic chain, or aromatic, such as methyl, ethyl, isopropyl, phenyl, methyl-cyclohexyl and the like; and $R^1$ represents hydrogen or a hydrocarbon carboxylic acyl group of less than 12 carbon atoms.

The acyl and acyloxy groups are derived from hydrocarbon carboxylic acids containing less than 12 carbon atoms which may be saturated or unsaturated, of straight, branched, cyclic or cyclicaliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclophentylpropionate, aminoacetate, and β-chloropropionate.

The compounds represented by the above formula are valuable cortical hormones with high anti-inflammatory, low catabolic, glycogenic and thymolytic activitites. In addition, they are anti-androgenic, anti-gonadotropic and anti-estrogenic hormones. Furthermore, they have high topical activity in skin disorders such as psoriasis, allergic dermatitis and the like.

The novel compounds of the present invention are prepared by the process illustrated by the following formula scheme:

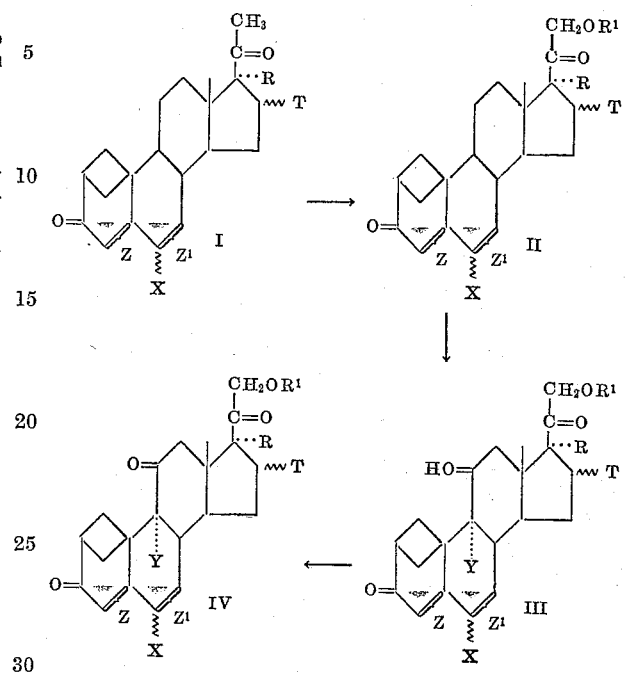

In the above formulae R, $R^1$, T, Y, Z, $Z^1$ and X have the same meaning as previously defined.

In practicing the process outlined above, the starting compound (I) which is a 2,19-cyclo-allopregnam-17α-ol-3,20-dione, a 2,19-cyclo-$\Delta^4$-pregnen-17α-ol-3,20-dione or a 2,19-cyclo-$\Delta^{4,6}$-pregnadien-17α-ol-3,20-dione derivative, is treated with iodine in the presence of calcium oxide to give the corresponding 21-iodo derivative which upon treatment with potassium acetate, in a suitable solvent, such as acetone, preferably at reflux temperature, affords the corresponding 21-acetoxy-2,19-cyclo-pregnan-17α-ol-3,20-dione deriavtive (II).

The latter derivative upon incubation with adrenal glands in a suitable medium, e.g. an aqueous solution of alkali metal phosphates and chlorides and magnesium sulfate, mixed with an aqueous solution of fumaric acid and sodium hydroxide, for a period of time of the order of 3 hours at approximately 28–37° C., yields the corresponding 21acetoxy-2,19-cyclopregnane-11β,17α-diol-3,20-dione (III: Y=H). The latter 11β-ol (III: Y=H) is treated with mesyl chloride in dimethyl formamide and pyridine at approximately 80° C. for about half an hour to produce the corresponding 21-acetoxy-2,19-cyclo-$\Delta^{9(11)}$-pregnen-17α-ol-3,20-dione derivative. The last named $\Delta^{9(11)}$-derivative is treated with N-bromoamide or imide, such as N-bromoacetamide, in the presence of perchloric acid, in an inert solvent, such as for example dioxane, to give the corresponding 9α-bromo-11β-ol which upon treatment with the mild base, such as potassium acetate in acetone, preferably at reflux temperature, affords the corresponding 2,19-cyclo-9β,11β-oxido pregnen derivative.

The latter 9β,11β-oxido compound, upon treatment with a hydrogen halide, such as hydrogen fluoride or hydrogen chloride, in a suitable inert organic solvent, e.g. methylene chloride or chloroform, yields the corresponding 21-acetoxy-9α-halo-2,19-cyclo-pregnane-11β,17α-diol-3,20-dione derivative (III: Y=halogen). The 11β-hydroxyl group of the latter compounds as well as of the 9α-unsubstituted 11β-ols (III: Y=H) is oxidized preferably with Jones reagent (chromic trioxide in sulfuric acid), thus affording the corresponding ketones (IV).

The compounds of the present invention having a 16α,

17α-ketonide grouping, yield the corresponding 16α,17α-diols by conventional treatment with an acid, such as acetic acid. The obtained diols, upon conventional esterification in pyridine with an acylating agent, as for example acetic anhydride or caproic anhydride, afford the corresponding 16-acylates.

The latter 16α,17α-diols upon conventional condensation with a ketone or aldehyde, such as benzaldehyde, acetophenone, methyl-ethyl ketone, acetone, and the like, in the presence of an acid, yield the corresponding 16α,17α-methylenedioxy derivatives, wherein the substituents in the methylenedioxy group may be different from those of the previously hydrolyzed ketonide grouping.

The compounds of the present invention having a 21-acyloxy group, may be saponified by conventional treatment with a base to produce the corresponding 21-free alcohols which, in turn, may be acylated conventionally in pyridine with an acylating agent to give the corresponding 21-acylates, wherein the acyl group may be different from the previously saponified one.

The following specific examples serve to illustrate the present invention, but are not intended to limit the scope thereof:

*Example I*

A cooled solution of 4 g. of 16α,17α-isopropylidenedioxy-2,19-cyclo-allopregnane-3,20-dione (obtained according to my copending U.S. pat. appl. Ser. No. 231,828 filed of even date) in 30 cc. of tetrahydrofuran and 18 cc. of methanol was treated under continuous stirring with 6 g. of pure calcium oxide, in small portions, and then with 6 g. of iodine. The stirring was continued at room temperature until the solution turned pale yellow. The mixture was poured into ice water containing 18 cc. of acetic acid and 2 g. of sodium thiosulfate. After stirring for 15 minutes the solution was decanted and the precipitate was collected by filtration, thus giving the 21-iodo derivative of the starting compound. This compound was mixed with 80 cc. of acetone and 12 g. of recently fused potassium acetate and the mixture was refluxed for 8 hours, concentrated to a small volume, diluted with water and extracted with ethyl acetate; the extract was washed with water, dried over anhydrous sodium sulfate and concentrated until crystallization started. The precipitate was collected and crystallized from methanol-water, thus yielding 21-acetoxy-16α,17α-isopropylidenedioxy-2,19-cyclo-allopregnane-3,20-dione (Compound No. 1).

The starting compounds listed under I (obtained in accordance with the aforesaid patent application) were treated by the above procedure, furnishing firstly the corresponding 21-iodo derivatives and thereafter, respectively, the products set forth under II.

| I | Cpd. No. | II |
|---|---|---|
| 2,19-cyclo-allopregnan-17α-ol-3,20-dione. | 2 | 21-acetoxy-2,19-cyclo-allopregnan-17α-ol-3,20-dione. |
| 16α-methyl-2,19-cyclo-allopregnan-17α-ol-3,20-dione. | 3 | 21-acetoxy-16α-methyl-2,19-cyclo-allopregnan-17α-ol-3,20-dione. |
| 16α,17α-isopropylidenedioxy 2,19-cyclo-Δ⁴-pregnene-3,20-dione. | 4 | 21-acetoxy-16α,17α-isopropyl-dienedioxy-2,19-cyclo-Δ⁴-pregnene-3,20-dione. |
| 2,19-cyclo-Δ⁴-pregnen-17α-ol-3,20-dione. | 5 | 21-acetoxy-2,19-cyclo-Δ⁴-pregnen-17α-ol-3,20-dione. |
| 16α-methyl-2,19-cyclo-Δ⁴-pregnen-17α-ol-3,20-dione. | 6 | 21-acetoxy-16α-methyl-2,19-cyclo-Δ⁴-pregnen-17α-ol-3,20-dione. |
| 6β-chloro-16α,17α-isopropyl-denedioxy-2,19-cyclo-Δ⁴-pregnene-3,20-dione. | 7 | 21-acetoxy-6β-chloro-16α,17α-isopropylidenedioxy-2,19-cyclo-Δ⁴-pregnene-3,20-dione. |
| 6β-chloro-2,19-cyclo-Δ⁴-pregnen-17α-ol-3,20-dione. | 8 | 21-acetoxy-6β-chloro-2,19-cyclo-Δ⁴-pregnen-17α-ol-3,20-dione. |
| 6β-chloro-16α-methyl-2,19-cyclo-Δ⁴-pregnen-17α-ol-3,20-dione. | 9 | 21-acetoxy-6β-chloro-16α-methyl-2,19-cyclo-Δ⁴-pregnen-17α-ol-3,20-dione. |
| 6β-fluoro-16α,17α-isopropyl-denedioxy-2,19-cyclo-Δ⁴-pregnene-3,20-dione. | 10 | 21-acetoxy-6β-fluoro-16α,17α-isopropylidenedioxy-2,19-cyclo-Δ⁴-pregnene-3,20-dione. |
| 6β-fluoro-2,19-cyclo-Δ⁴-pregnen-17α-ol-3,20-dione. | 11 | 21-acetoxy-6β-fluoro-2,19-cyclo-Δ⁴-pregnen-17α-ol-3,20-dione. |
| 6β-fluoro-16α-methyl-2,19-cyclo-Δ⁴-pregnen-17α-ol-3,20-dione. | 12 | 21-acetoxy-6β-fluoro-16α-methyl-2,19-cyclo-Δ⁴-pregnen-17α-ol-3,20-dione. |
| 6α-chloro-16α-17α-isopropyl-denedioxy-2,19-cyclo-Δ⁴-pregnene-3,20-dione. | 13 | 21-acetoxy-6α-chloro-16α,17α-isopropylidenedioxy-2,19-cyclo-Δ⁴-pregnene-3,20-dione. |
| 6α-chloro-2,19-cyclo-Δ⁴-pregnen-17α-ol-3,20-dione. | 14 | 21-acetoxy-6α-chloro-2,19-cyclo-Δ⁴-pregnen-17α-ol-3,20-dione. |
| 6α-chloro-16α-methyl-2,19-cyclo-Δ⁴-pregnen-17α-ol-3,20-dione. | 15 | 21-acetoxy-6α-chloro-16α-methyl-2,19-cyclo-Δ⁴-pregnen-17α-ol-3,20-dione. |
| 6α-fluoro-16α,17α-isopropyl-denedioxy-2,19-cyclo-Δ⁴-pregnene-3,20-dione. | 16 | 21-acetoxy-6α-fluoro-16α,17α-isopropylidenedioxy-2,19-cyclo-Δ⁴-pregnene-3,20-dione. |
| 6α-fluoro-2,19-cyclo-Δ⁴-pregnen-17α-ol-3,20-dione. | 17 | 21-acetoxy-6α-fluoro-2,19-cyclo-Δ⁴-pregnen-17α-ol-3,20-dione. |
| 6α-fluoro-16α-methyl-2,19-cyclo-Δ⁴-pregnen-17α-ol-3,20-dione. | 18 | 21-acetoxy-6α-fluoro-16α-methyl-2,19-cyclo-Δ⁴-pregnen-17α-ol-3,20-dione. |
| 6-chloro-16α,17α-isopropyl-denedioxy-2,19-cyclo-Δ⁴,⁶-pregnadiene-3,20-dione. | 19 | 21-acetoxy-6-chloro-16α,17α-isopropylidenedioxy-2,19-cyclo-Δ⁴,⁶-pregnadiene-3,20-dione. |
| 6-chloro-2,19-cyclo-Δ⁴,⁶-pregnadien-17α-ol-3,20-dione. | 20 | 21-acetoxy-6-chloro-2,19-cyclo-Δ⁴,⁶-pregnadien-17α-ol-3,20-dione. |
| 6-chloro-16α-methyl-2,19-cyclo-Δ⁴,⁶-pregnadien-17α-ol-3,20-dione. | 21 | 21-acetoxy-6-chloro-16α-methyl-2,19-cyclo-Δ⁴,⁶-pregnadien-17α-ol-3,20-dione. |
| 6-fluoro-16α,17α-isopropyl-denedioxy-2,19-cyclo-Δ⁴,⁶-pregnadiene-3,20-dione. | 22 | 21-acetoxy-6-fluoro-16α,17α-isopropylidenedioxy-2,19-cyclo-Δ⁴,⁶-pregnadiene-3,20-dione. |
| 6-fluoro-2,19-cyclo-Δ⁴,⁶-pregnadien-17α-ol-3,20-dione. | 23 | 21-acetoxy-6-fluoro-2,19-cyclo-Δ⁴,⁶-pregnadien-17α-ol-3,20-dione. |
| 6-fluoro-16α-methyl-2,19-cyclo-Δ⁴,⁶-pregnadien-17α-ol-3,20-dione. | 24 | 21-acetoxy-6-fluoro-16α-methyl-2,19-cyclo-Δ⁴,⁶-pregnadien-17α-ol-3,20-dione. |
| 16α,17α-isopropylidenedioxy-2,19-cyclo-Δ⁴,⁶-pregnadiene-3,20-dione. | 25 | 21-acetoxy-16α,17α-isopropyl-denedioxy-2,19-cyclo-Δ⁴,⁶-pregnadiene-3,20-dione. |
| 2,9-cyclo-Δ⁴,⁶-pregnadien-17α-ol-3,20-dione. | 26 | 21-acetoxy-2,19-cyclo-Δ⁴,⁶-pregnadien-17α-ol-3,20-dione. |
| 16α-methyl-2,19-cyclo-Δ⁴,⁶-pregnadien-17α-ol-3,20-dione. | 27 | 21-acetoxy-16α-methyl-2,19-cyclo-Δ⁴,⁶-pregnadien-17α-ol-3,20-dione. |

*Example II*

The following solutions "A," "B" and "C" were prepared using distilled water as solvent: solution "A" was prepared by mixing 425 cc. of a 1.742% dipotassic phosphate solution ($K_2HPO_4$) with 75 cc. of 1.38% monosodic phosphate; solution "B" was prepared by diluting a mixture of 1 lt. of 4.5% sodium chloride solution, 40 cc. of a 5.75% potassium chloride solution and 10 cc. of a 19.1% magnesium sulfate, to a volume of 5 lt; solution "C" was prepared by dissolving 20.9 g. of fumaric acid and 14.4 g. of sodium hydoxide in 1 lt. of water and diluting the solution to 1.2 lt. Then 475 cc. of solution "A," 4.32 lt. of solution "B" and 1.2 lt. of solution "C" were mixed.

Adrenal glands of recently slaughtered cattle, defatted, were ground in a meat grinder until a homogeneous mass was obtained; to 1 kg. of homogenate was added 2 liters of the mixture of A, B, and C solution with vigorous stirring. To the mixture there was then added 1 g. of compound No. 1 dissolved in 5.35 parts of propylenglycol, the mixture was stirred at 28–37° C. for 3 hours, 13 liters of acetone were added and the mass was stirred at room temperature for an additional 1 hour.

The acetone extract was separated by filtration, the ground adrenals were washed with 6 liters of acetone, the extracts were combined and the solvent removed by distillation under reduced presure. Chromatography on alumina and crystallization of the solid fractions afforded 21-acetoxy-16α,17α-isopropylidenedioxy-2,19-cyclo-allopregnan-11β-ol-3,20-dione (Cpd. No. 28).

The Compounds Nos. 2 to 27, inclusive were treated according to the same procedure, thus affording respectively:

Cpd.
No.
(29) 21-acetoxy-2,19-cyclo-allopregnane-11β,17α-diol-3,20-dione,
(30) 21-acetoxy-6α-methyl-2,19-cyclo-allopregnane-11β,17α-diol-3,20-dione,
(31) 21-acetoxy-16α,17α-isopropylidenedioxy-2,19-cyclo-Δ$^4$-pregnen-11β-ol-3,20-dione,
(32) 21-acetoxy-2,19-cyclo-Δ$^4$-pregnene-11β,17α-diol-3,20-dione,
(33) 21-acetoxy-16α-methyl-2,19-cyclo-Δ$^4$-pregnene-11β,17α-diol-3,20-dione,
(34) 21-acetoxy-6β-chloro-16α,17α-isopropylidenedioxy-2,19-cyclo-Δ$^4$-pregnen-11β-ol-3,20-dione,
(35) 21-acetoxy-6β-chloro-2,19-cyclo-Δ$^4$-pregnene-11β,17α-diol-3,20-dione,
(36) 21-actoxy-6β-chloro-16α-methyl-2,19-cyclo-Δ$^4$-pregnene-11β,17α-diol-3,20-dione,
(37) 21-acetoxy-6β-fluoro-16α,17α-isopropylidenedioxy-2,19-cyclo-Δ$^4$-pregnen-11β-ol-3,20-dione,
(38) 21-acetoxy-6β-fluoro-2,19-cyclo-Δ$^4$-pregnene-11β,17α-diol-3,20-dione,
(39) 21-acetoxy-6β-fluoro-16α-methyl-2,19-cyclo-Δ$^4$-pregnene-11β,17α-diol-3,20-dione,
(40) 21-acetoxy-6α-chloro-16α,17α-isopropylidenedioxy-2,19-cyclo-Δ$^4$-pregnen-11β-ol-3,20-dione,
(41) 21-acetoxy-6α-chloro-2,19-cyclo-Δ$^4$-pregnene-11β,17α-diol-3,20-dione,
(42) 21-acetoxy-6α-chloro-16α-methyl-2,19-cyclo-Δ$^4$-pregnene-11β,17α-diol-3,20-dione.
(43) 21-acetoxy-6α-fluoro-16α,17α-isopropylidenedioxy-2,19-cyclo-Δ$^4$-pregnen-11β-ol-3,20-dione.
(44) 21-acetoxy-6α-fluoro-2,19-cyclo-Δ$^4$-pregnene-11β,17α-diol-3,20-dione.
(45) 21-acetoxy-6α-fluoro-16α-methyl-2,19-cyclo-Δ$^4$-pregnene-11β,17α-diol-3,20-dione.
(46) 21-acetoxy-6-chloro-16α,17α-isopropylidenedioxy-2,19-cyclo-Δ$^{4,6}$-pregnadien-11β-ol-3,20-dione.
(47) 21-acetoxy-6-chloro-2,19-cyclo-Δ$^{4,6}$-pregnadiene-11β,17α-diol-3,20-dione.
(48) 21-acetoxy-6-chloro-16α-methyl-2,19-cyclo-Δ$^{4,6}$-pregnadiene-11β,17α-diol-3,20-dione.
(49) 21-acetoxy-6-fluoro-16α,17α-isopropylidenedioxy-2,19-cyclo-Δ$^{4,6}$-pregnadien-11β-ol-3,20-dione.
(50) 21-acetoxy-6-fluoro-2,19-cyclo-Δ$^{4,6}$-pregnadiene-11β,17α-diol-3,20-dione.
(51) 21-acetoxy-6-fluoro-16α-methyl-2,19-cyclo-Δ$^{4,6}$-pregnadiene-11β,17α-diol-3,20-dione.
(52) 21-acetoxy-16α,17α-isopropylidenedioxy-2,19-cyclo-Δ$^{4,6}$-pregnadien-11β-ol-3,20-dione.
(53) 21-acetoxy-2,19-cyclo-Δ$^{4,6}$-pregnadiene-11β,17α-diol-3,20-dione.
(54) 21-acetoxy-16α-methyl-2,19-cyclo-Δ$^{4,6}$-pregnadiene-11β,17α-diol-3,20-dione.

*Example III*

10 g. of 21-acetoxy-16α,17α-isopropylidenedioxy-2,19-cyclo-allopregnan-11β-ol-3,20-dione (Cpd. No. 28) was dissolved with slow heating in 125 cc. of dimethyl-formamide, the mixture was cooled, 4.2 g. of mesyl chloride and 5 cc. of pyridine were added and the solution was kept at 80° C. for half an hour. The reaction mixture was cooled, water was added and the product was extracted with ethyl acetate. The extract was washed with water, dried over anhydrous sodium sulfate and the solvent was evaporated. Recrystallization of the residue from acetone-hexane furnished 21-acetoxy-16α,17α-isopropylidenedioxy - 2,19 - cyclo-Δ$^{9(11)}$-allopregnene-3,20-dione (Cpd. No. 55).

2.8 g. of N-bromoacetamide were added to a mixture of 5 g. of the latter compound 50 cc. of pure dioxane and 0.8 cc. of 0.4 N perchloric acid while stirring in the dark at room temperature during 1 hour. The reaction mixture was stirred for 1 hour further, a solution of 10% sodium sulfite was then added until the potassium-starch indicator paper no longer turned blue, ice was added, the mixture was extracted with chloroform and the extract was washed consecutively with water, 5% aqueous sodium bicarbonate solution and water, and the solvent was removed by distillation under vacuo. By trituration of the residue with acetone there was obtained the corresponding 9α-bromo-11β-hydroxyallopregnane derivative.

A mixture of 4.5 g. of anhydrous potassium acetate and 45 cc. of acetone was heated almost to boiling and then a solution of 4.2 g. of the above bromohydrin in 45 cc. of acetone was added slowly while stirring; the mixture was then refluxed for 10 hours, cooled and almost all of the acetone was distilled off; iced-water was then added, the precipitate was filtered, washed with water and dried. Upon recrystallization from methylene chloride-benzene there was obtained 21-acetoxy-9β,11β-oxido-16α,17α-isopropylidenedioxy - 2,19 - cyclo - allopregnane-3,20-dione (Cpd. No. 56).

To a solution of 4 g. of the latter compound in 40 cc. of anhydrous chloroform, was added, over a period of 35 minutes, 30 cc. of a 0.45 N solution of dry hydrogen chloride in chloroform, under continuous stirring and maintaining the temperature around 0° C.: The mixture was then stirred at 0° C. for 1 hour further, diluted with water and the chloroform layer was separated, washed with aqueous sodium bicarbonate solution and then with water, dried over anhydrous sodium sulfate and evaporated under reduced pressure. Crystallization of the residue from acetone-hexane gave 21-acetoxy-9α-chloro-16α, 17α - isopropylidenedioxy - 2,19 - cyclo-allopregnan-11β-ol-3,20-dione (Cpd. No. 57).

The Compounds Nos. 29 to 54, inclusive, were treated in accordance with the procedures described in Example III thus affording firstly the corresponding Δ$^{9(11)}$-derivatives, secondly the corresponding 9α-bromo-11β-hydroxy compounds, thirdly the corresponding 9β,11β-oxido derivatives and then respectively the following compounds:

Cpd.
No.:
(58) 21-acetoxy-9α-chloro-2,19-cyclo-allopregnane-11β,17α-diol-3,20-dione,
(59) 21-acetoxy-9α-chloro-16α-methyl-2,19-cyclo-allopregnane-11β,17α-diol-3,20-dione,
(60) 21-acetoxy-9α-chloro-16α,17α-isopropylidenedioxy-2,19-cyclo-Δ$^4$-pregnen-11β-ol-3,20-dione,
(61) 21-acetoxy-9α-chloro-2,19-cyclo-Δ$^4$-pregnene-11β,17α-diol-3,20-dione,
(62) 21-acetoxy-9α-chloro-16α-methyl-2,19-cyclo-Δ$^4$-pregnene-11β,17α-diol-3,20-dione,
(63) 21-acetoxy-6β,9α-dichloro-16α,17α-isopropylidenedioxy-2,19-cyclo-Δ$^4$-pregnen-11β-ol-3,20-dione,
(64) 21-acetoxy-6β,9α-dichloro-2,19-cyclo-Δ$^4$-pregnene-11β,17α-diol-3,20-dione,
(65) 21-acetoxy-6β,9α-dichloro-16α-methyl-2,19-cyclo-Δ$^4$-pregnene-11β,17α-diol-3,20-dione,
(66) 21-acetoxy-6β-fluoro-9α-chloro-16α,17α-isopropylidenedioxy-2,19-cyclo-Δ$^4$-pregnen-11β-ol-3,20-dione,
(67) 21-acetoxy-6β-fluoro-9α-chloro-2,19-cyclo-Δ$^4$-pregnene-11β,17α-diol-3,20-dione,
(68) 21-acetoxy-6β-fluoro-9α-chloro-16α-methyl-2,19-cyclo-Δ$^4$-pregnene-11β,17α-diol-3,20-dione,
(69) 21-acetoxy-6α,9α-dichloro-16α,17α-isopropylidenedioxy-2,19-cyclo-Δ$^4$-pregnen-11β-ol-3,20-dione,
(70) 21-acetoxy-6α,9α-dichloro-2,19-cyclo-Δ$^4$-pregnene-11β,17α-diol-3,20-dione,
(71) 21-acetoxy-6α,9α-dichloro-16α-methyl-2,19-cyclo-Δ$^4$-pregnene-11β,17α-diol-3,20-dione,
(72) 21-acetoxy-6α-fluoro-9α-chloro-16α,17α-isopropylidenedioxy-2,19-cyclo-Δ$^4$-pregnen-11β-ol-3,20-dione,
(73) 21-acetoxy-6α-fluoro-9α-chloro-2,19-cyclo-Δ$^4$-pregnene-11β,17α-diol-3,20-dione,

(74) 21-acetoxy-6α-fluoro-9α-chloro-16α-methyl-2,19-cyclo-Δ⁴-pregnene-11β,17α-diol-3,20-dione,
(75) 21-acetoxy-6,9α-dichloro-16α,17α-isopropylidenedioxy-2,19-cyclo-Δ⁴,⁶-pregnadien-11β-ol-3,20-dione,
(76) 21-acetoxy-6,9α-dichloro-2,19-cyclo-Δ⁴,⁶-pregnadiene-11β,17α-diol-3,20-dione,
(77) 21-acetoxy-6,9α-dichloro-16α-methyl-2,19-cyclo-Δ⁴,⁶-pregnadiene-11β,17α-diol-3,20-dione,
(78) 21-acetoxy-6-fluoro-9α-chloro-16α,17α-isopropylidenedioxy-2,19-cyclo-Δ⁴,⁶-pregnadien-11β-ol-3,20-dione,
(79) 21-acetoxy-6-fluoro-9α-chloro-2,19-cyclo-Δ⁴,⁶-pregnadiene-11β,17α-diol-3,20-dione,
(80) 21-acetoxy-6-fluoro-9α-chloro-16α-methyl-2,19-cyclo-Δ⁴,⁶-pregnadiene-11β,17α-diol-3,20-dione,
(81) 21-acetoxy-9α-chloro-16α,17α-isopropylidenedioxy-2,19-cyclo-Δ⁴,⁶-pregnadien-11β-ol-3,20-dione,
(82) 21-acetoxy-9α-chloro-2,19-cyclo-Δ⁴,⁶-pregnadien-11β,17α-diol-3,20-dione,
(83) 21-acetoxy-9α-chloro-16α-methyl-2,19-cyclo-Δ⁴,⁶-pregnadien-11β,17α-diol-3,20-dione.

*Example IV*

In a polyethylene flask, adapted with magnetic stirrer, there was dissolved 1.8 g. of 21-acetoxy-9β,11β-oxido-16α,17α - isopropylidenedioxy - 2,19 - cyclo - allopregnane-3,20-dione (Cpd. No. 56), in 30 cc. of methylene chloride, the solution was cooled to 0° C. and a solution of 2.11 g. of anhydrous hydrogen fluoride in 3.7 cc. of tetrahydrofurane cooled in a Dry-Ice acetone bath (−70° C.) was added over a period of 20 minutes with constant stirring. The mixture was stirred at a temperature lower than 10° C. for 6 additional hours, then neutralized by cautiously adding a 5% aqueous sodium bicarbonate solution and transferred to a separatory funnel. The organic layer was washed with water, dried over anhydrous sodium sulfate and concentrated until formation of an abundant precipitate. The mixture was cooled, the precipitate filtered and redissolved in hot ethyl acetate, the insoluble material was filtered off and the filtrate cooled whereby the recrystallized 21-acetoxy-9α-fluoro-16α,17α - isopropylidenedioxy - 2,19 - cyclo - allopregnane-11β-ol-3,20-dione (Cpd. No. 84).

The Compounds Nos. 29 to 54, inclusive, were converted into the corresponding 9β,11β-oxido compounds, in accordance with Example III, which, in turn, were treated by the above described procedure, thus affording respectively:

Cpd.
No.:

(85) 21 - acetoxy - 9α - fluoro - 2,19 - cyclo - allopregnane-11β,17α-diol-3,20-dione,
(86) 21 - acetoxy - 9α - fluoro - 16α - methyl - 2,19-cyclo-allopregnane-11β,17α-diol-3,20-dione,
(87) 21 - acetoxy - 9α - fluoro - 16α,17α - isopropylidenedioxy-2,19-cyclo-Δ⁴-pregnene-11β-ol-3,20-dione,
(88) 21 - acetoxy - 9α - fluoro - 2,19 - cyclo - Δ⁴ - pregnene-11β,17α-diol-3,20-dione,
(89) 21 - acetoxy - 9α - fluoro - 16α - methyl - 2,19-cyclo-Δ⁴-pregnene-11β,17α-diol-3,20-dione,
(90) 21 - acetoxy - 6β - chloro - 9α - fluoro - 16α,17α-isopropylidenedioxy - 2,19 - cyclo - Δ⁴ - pregnen - 11β-ol-3,20-dione,
(91) 21 - acetoxy - 6β - chloro - 9α - fluoro - 2,19 - cyclo-Δ⁴-pregnene-11β,17α-diol-3,20-dione,
(92) 21 - acetoxy - 6β - chloro - 9α - fluoro - 16α - methyl-2,19 - cyclo - Δ⁴ - pregnene - 11β,17α - diol - 3,20-dione,
(93) 21 - acetoxy - 6β,9α - difluoro - 16α,17α - isopropylidenedioxy - 2,19 - cyclo - Δ⁴ - pregnen - 11β - ol-3,20-dione,
(94) 21 - acetoxy - 6β,9α - difluoro - 2,19 - cyclo - Δ⁴-pregnene-11β,17α-diol-3,20-dione,
(95) 21 - acetoxy - 6β,9α - difluoro - 16α - methyl - 2,19-cyclo-Δ⁴-pregnene-11β,17α-diol-3,20-dione,
(96) 21 - acetoxy - 6α - chloro - 9α - fluoro - 16α,17α-isopropylidenedioxy - 2,19 - cyclo - Δ⁴ - pregnen - 11β-ol-3,20-dione,
(97) 21 - acetoxy - 6α - chloro - 9α - fluoro - 2,19 - cyclo-Δ⁴-pregnene-11β,17α-diol-3,20-dione,
(98) 21 - acetoxy - 6α - chloro - 9α - fluoro - 16α - methyl-2,19 - cyclo - Δ⁴ - pregnene - 11β,17α - diol - 3,20 - dione,
(99) 21 - acetoxy - 6α,9α - difluoro - 16α,17α - isopropylidenedioxy-2,19-cyclo-Δ⁴-pregnen-11β-ol-3,20-dione,
(100) 21 - acetoxy - 6α,9α - difluoro - 2,19 - cyclo - Δ⁴-pregnene-11β,17α-diol-3,20-dione,
(101) 21 - acetoxy - 6α,9α - difluoro - 16α - methyl - 2,19-cyclo-Δ⁴-pregnene-11β,17α-diol-3,20-dione,
(102) 21 - acetoxy - 6 - chloro - 9α - fluoro - 16α,17α-isopropylidenedioxy - 2,19 - cyclo - Δ⁴,⁶ - pregnadien-11β-ol-3,20-dione,
(103) 21 - acetoxy - 6 - chloro - 9α - fluoro - 2,19 - cyclo-Δ⁴,⁶-pregnadiene-11β,17α-diol-3,20-dione,
(104) 21 - acetoxy - 6 - chloro - 9α - fluoro - 16α - methyl-2,19 - cyclo - Δ⁴,⁶ - pregnadiene - 11β,17α - diol - 3,20-dione,
(105) 21 - acetoxy - 6,9α - difluoro - 16α,17α - isopropylidenedioxy - 2,19 - cyclo - Δ⁴,⁶ - pregnadien - 11β-ol-3,20-dione,
(106) 21 - acetoxy - 6,9α - difluoro - 2,19 - cyclo - Δ⁴,⁶-pregnadiene-11β,17α-diol-3,20-dione,
(107) 21 - acetoxy - 6,9α - difluoro - 16α - methyl - 2,19-cyclo-Δ⁴,⁶-pregnadiene-11β,17α-diol-3,20-dione,
(108) 21 - acetoxy - 9α - fluoro - 16α,17α - isopropylidenedioxy - 2,19 - cyclo - Δ⁴,⁶ - pregnadien - 11β - ol-3,20-dione,
(109) 21 - acetoxy - 9α - fluoro - 2,19 - cyclo - Δ⁴,⁶-pregnadiene-11β-17α-diol-3,20-dione,
(110) 21 - acetoxy - 9α - fluoro - 16α - methyl - 2,19-cyclo-Δ⁴,⁶-pregnadiene-11β,17α-diol-3,20-dione,

*Example V*

A solution of 1 g. of 21-acetoxy-16α,-17α-isopropylidenedioxy-2,19-cyclo-allopregnan-11β-ol-3,20-dione (Cpd. No. 28) in 10 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave 21 - acetoxy - 16α,17α-isopropylidenedioxy-2,19-cycloallopregnane-3,11,20-trione (Cpd. No. 111).

The Compounds Nos. 29 to 54, inclusive, were treated in accordance with the above procedure, thus yielding respectively:

Cpd.
No.:

(112) 21-acetoxy-2,19-cyclo-allopregnan-17α-ol-3,11,20-trione,
(113) 21-acetoxy-16α-methyl-2,19-cyclo-allopregnan-17α-ol-3,11,20-trione,
(114) 21-acetoxy-16α,17α-isopropylidenedioxy-2,19-cyclo-Δ⁴-pregnene-3,11,20-trione,
(115) 21-acetoxy-2,19-cyclo-Δ⁴-pregnen-17α-ol-3,11,20-trione,
(116) 21-acetoxy-16α-methyl-2,19-cyclo-Δ⁴-pregnen-17α-ol-3,11,20-trione,
(117) 21-acetoxy-6β-chloro-16α,17α-isopropylidenedioxy-2,19-cyclo-Δ⁴-pregnene-3,11,20-trione,
(118) 21-acetoxy-6β-chloro-2,19-cyclo-Δ⁴-pregnen-17α-ol-3,11,20-trione,
(119) 21-acetoxy-6β-chloro-16α-methyl-2,19-cyclo-Δ⁴-pregnen-17α-ol-3,11,20-trione, (120) 21-acetoxy-6β-fluoro-16α,17α-isopropylidenedioxy-2,19-cyclo-Δ⁴-pregnene-3,11,20-trione,
(121) 21-acetoxy-6β-fluoro-2,19-cyclo-Δ⁴-pregnen-17α-ol-3,11,20-trione,
(122) 21-acetoxy-6β-fluoro-16α-methyl-2,19-cyclo-Δ⁴-pregnen-17α-ol-3,11,20-trione,
(123) 21-acetoxy-6α-chloro-16α,17α-isopropylidendioxy-2,19-cyclo-Δ⁴-pregnene-3,11,20-trione,
(124) 21-acetoxy-6α-chloro-2,19-cyclo-Δ⁴-pregnen-17α-ol-3,11,20-trione,
(125) 21-acetoxy-6α-chloro-16α-methyl-2,19-cyclo-Δ⁴-pregnen-17α-ol-3,11,20-trione,
(126) 21-acetoxy-6α-fluoro-16α,17α-isopropylidenedioxy-2,19-cyclo-Δ⁴-pregnene-3,11,20-trione,
(127) 21-acetoxy-6α-fluoro-2,19-cyclo-Δ⁴-pregnen-17α-ol-3,11,20-trione,
(128) 21-acetoxy-6α-fluoro-16α-methyl-2,19-cyclo-Δ⁴-pregnen-17α-ol-3,11,20-trione,
(129) 21-acetoxy-6-chloro-16α,17α-isopropylidenedioxy-2,19-cyclo-Δ⁴,⁶-pregnadiene-3,11,20-trione,
(130) 21-acetoxy-6-chloro-2,19-cyclo-Δ⁴,⁶-pregnadien-17α-ol-3,11,20-trione,
(131) 21-acetoxy-6-chloro-16α-methyl-2,19-cyclo-Δ⁴,⁶-pregnadien-17α-ol-3,11,20-trione,
(132) 21-acetoxy-6-fluoro-16α,17α-isopropylidenedioxy-2,19-cyclo-Δ⁴,⁶-pregnadiene-3,11,20-trione,
(133) 21-acetoxy-6-fluoro-2,19-cyclo-Δ⁴,⁶-pregnadien-17α-ol-3,11,20-trione,
(134) 21-acetoxy-6-fluoro-16α-methyl-2,19-cyclo-Δ⁴,⁶-pregnadien-17α-ol-3,11,20-trione,
(135) 21-acetoxy-16α,17α-isopropylidenedioxy-2,19-cyclo-Δ⁴,⁶-pregnadiene-3,11,20-trione,
(136) 21-acetoxy-2,19-cyclo-Δ⁴,⁶-pregnadien-17α-ol-3,11,20-trione,
(137) 21-acetoxy-16α-methyl-2,19-cyclo-Δ⁴,⁶-pregnadien-17α-ol-3,11,20-trione,

*Example VI*

The Compounds Nos. 57 to 110 inclusive, were treated in accordance with Example V, thus affording respectively:
Cpd.
No.:
(138) 21-acetoxy-9α-chloro-16α,17α-isopropylidenedioxy-2,19-cyclo-allopregnan-17α-ol-3,11,20-trione,
(139) 21-acetoxy-9α-chloro-2,19-cyclo-allopregnan-17α-ol-3,11,20-trione,
(140) 21-acetoxy-9α-chloro-16α-methyl-2,19-cyclo-allopregan-17α-ol-3,11,20-trione,
(141) 21-acetoxy-9α-chloro-16α,17α-isopropylidenedioxy-2,19-cyclo-Δ⁴-pregnene-3,11,20-trione,
(142) 21-acetoxy-9α-chloro-2,19-cyclo-Δ⁴-pregnen-17α-ol-3,11,20-trione,
(143) 21-acetoxy-9α-chloro-16α-methyl-2,19-cyclo-Δ⁴-pregnen-17α-ol-3,11,20-trione,
(144) 21-acetoxy-6β,9α-dichloro-16α,17α-isopropylidenedioxy-2,19-cyclo-Δ⁴-pregnene-3,11,20-trione,
(145) 21-acetoxy-6β,9α-dichloro-2,19-cyclo-Δ⁴-pregnen-17α-ol-3,11,20-trione,
(146) 21-acetoxy-6β,9α-dichloro-16α-methyl-2,19-cyclo-Δ⁴-pregnen-17α-ol-3,11,20-trione,
(147) 21-acetoxy-6β-fluoro-9α-chloro-16α,17α-isopropylidenedioxy-2,19-cyclo-Δ⁴-pregnene-3,11,20-trione,
(148) 21-acetoxy-6β-fluoro-9α-chloro-2,19-cyclo-Δ⁴-pregnen-17α-ol-3,11,20-trione,
(149) 21-acetoxy-6β-fluoro-9α-chloro-16α-methyl-2,19-cyclo-Δ⁴-pregnen-17α-ol-3,11,20-trione,
(150) 21-acetoxy-6α,9α-dichloro-16α,17α-isoproprutylidenedioxy 2,19-cyclo-Δ⁴-pregnene-3,11,20-trione,
(151) 21-acetoxy-6α,9α-dichloro-2,19-cyclo-Δ⁴-pregnen-17α-ol-3,11,20-trione,
(152) 2-acetoxy-6α,9α-dichloro-16α-methyl-2,19-cyclo-Δ⁴-pregnen-17α-ol-3,11,20-trione.
(153) 21-acetoxy-6α-fluoro-9α-chloro-16α,17α-isopropylenedioxy-2,19-cyclo-Δ⁴-pregnene-3,11,20-trione,
(154) 21-acetoxy-6α-fluoro-9α-chloro-2,19-cyclo-Δ⁴-pregnen-17α-ol-3,11,20-trione,
(155) 21-acetoxy-6α-fluoro-9α-choloro-16α-methyl-2,19-cyclo-Δ⁴-pregnen-17α-ol-3,11,20-trione,
(156) 21-acetoxy-6,9α-dichloro-16α-17α-isopropylidenedioxy-2,19-cyclo-Δ⁴,⁶-pregnadiene-3,11,20-trione,
(157) 21-acetoxy-6,9α-dichloro-2,19-cyclo-Δ⁴,⁶-pregnadien-17α-ol-3,11,20-trione,
(158) 21-acetoxy-6,9α-dichloro-16α-methyl-2,9-cyclo-Δ⁴,⁶-pregnadien-17α-ol-3,11,20-trione,
(159) 21-acetoxy-6-fluoro-9α-chloro-16α,17α-isopropylidenedioxy-2,19-cyclo-Δ⁴,⁶-pregnadiene-3,11,20-trione,
(160) 21-acetoxy-6-fluoro-9α-chloro-2,19-cyclo-Δ⁴,⁶-pregnadien-17α-ol-3,11,20-trione,
(161) 21-acetoxy-6-fluoro-9α-chloro-16α-methyl-2,19-cyclo-Δ⁴,⁶-pregnadien-17α-ol-3,11,20-trione,
(162) 21-acetoxy-9α-chloro-16α,17α-isopropylidenedioxy-2,19-cycloΔ⁴,⁶-pregnadiene-3,11,20-trione,
(163) 21-acetoxy-9α-chloro-2,19-cyclo-Δ⁴,⁶-pregnadien-17α-ol-3,11,20-trione,
(164) 21-acetoxy-9α-chloro-16α-methyl-2,19-cyclo-Δ⁴,⁶-pregnadien-17α-ol-3,11,20-trione,
(165) 21-acetoxy-9α-fluoro-16α,17α-isopropylidenedioxy-2,19-cyclo-allopregnane-3,11,20-trione,
(166) 21-acetoxy-9α-fluoro-2,19-cyclo-allopregnan-17α-ol-3,11,20-trione,
(167) 21-acetoxy-9α-fluoro-16α-methyl-2,19-cyclo-allopregnan-17α-ol-3,11,20-trione,
(168) 21-acetoxy-9α-fluoro-16,17α-isopropylidenedioxy-2,19-cyclo-Δ⁴-pregnene-3,11,20-trione,
(169) 21-acetoxy-9α-fluoro-2,19-cyclo-Δ⁴-pregnen-17α-ol-3,11,20-trione,
(170) 21-acetoxy-9α-fluoro-16α-methyl-2,19-cyclo-Δ⁴-pregnen-17α-ol-3,11,20-trione,
(171) 21-acetoxy-6β-chloro-9α-fluoro-16α,17α-isopropylidenedioxy-2,19-cyclo-Δ⁴-pregnene-3,11,20-trione,
(172) 21-acetoxy-6β-chloro-9α-fluoro-2,19-cyclo-Δ⁴-pregnen-7α-ol-3,11,20-trione,
(173) 21-acetoxy-6β-chloro-9α-fluoro-16α-methyl-2,19-cyclo-Δ⁴-pregnen-17α-ol-3,11,20-trione,
(174) 21-acetoxy-6β,9α-difluoro-16α,17α-isopropylidenedioxy-2,19-cyclo-Δ⁴-pregnene-3,11,20-trione,
(175) 21-acetoxy-6β,9α-difluoro-2,19-cyclo-Δ⁴-pregnen-17α-ol-3,11,20-trione,
(176) 21 acetoxy-6β,9α-difluoro-16α-methyl-2,19-cyclo-Δ⁴-pregnen-17α-ol-3,11,20-trione,
(177) 21-acetoxy-6α-chloro-9α-fluoro-16α,17α-isopropylidenedioxy-2,19-cyclo-Δ⁴-pregnene-3,11,20-trione,
(178) 21-acetoxy-6α-chloro-9α-fluoro-2,19-cyclo-Δ⁴-pregnen-17α-ol-3,11,20-trione,
(179) 21-acetoxy-6α-chloro-9α-fluoro-16α-methyl-2,19-cyclo-Δ⁴-pregnen-17α-ol-3,11,20-trione,
(180) 21-acetoxy-6α,9α-difluoro-16α,17α-isopropylidenedioxy-2,19-cyclo-Δ⁴-pregnene-3,11,20-trione,
(181) 21-acetoxy-6α,9α-difluoro-2,19-cyclo-Δ⁴-pregnen-17α-ol-3,11,20-trione,
(182) 21-acetoxy-6α,9α-difluoro-16α-methyl-2,19-cyclo-Δ⁴-pregnen-17α-ol-3,11,20-trione,
(183) 21-acetoxy-6-chloro-9α-fluoro-16α,17α-isopropylidenedioxy-2,19-cyclo-Δ⁴,⁶-pregadiene-3,11,20-trione,
(184) 21-acetoxy-6-chloro-9α-fluoro-2,19-cyclo-Δ⁴,⁶-pregnadien-17α-ol-3,11,20-trione,
(185) 21-acetoxy-6-chloro-9α-fluoro-16α-methyl-2,19-cyclo-Δ⁴,⁶-pregnadien-17α-ol-3,11,20-trione,
(186) 21-acetoxy-6α,9α-difluoro-16α,17α-isopropylidenedioxy-2,19-cyclo-Δ⁴,⁶-pregnadiene-3,11,20-trione,
(187) 21 acetoxy-6α,9α-difluoro-2,19-cyclo-Δ⁴,⁶-pregnadien-17α-ol-3,11,20-trione,
(188) 21-acetoxy-6α,9α-difluoro-16α-methyl-2,19-cyclo-Δ⁴,⁶-pregnadien-17α-ol-3,11,20-trione,
(189) 21-acetoxy-9α-fluoro-16α,17α-isopropylidenedioxy-2,19-cyclo-Δ⁴,⁶-pregnadiene-3,11,20-trione, (190) 21-acetoxy-9α-fluoro-2,19-cyclo-Δ⁴,⁶-pregnadien-17α-ol-3,11,20-trione,
(191) 21-acetoxy-9α-fluoro-16α-methyl-2,19-cyclo-Δ⁴,⁶-pregnadien-17α-ol-3,11,20-trione,

*Example VII*

2 g. of 21-acetoxy-16α,17α-isopropylidenedioxy-2,19-cyclo-allopregnan-11β-ol-3,20-dione (Cpd. No. 28), was dissolved in 50 cc. of methanol and treated with 5 cc. of a 4% aqueous solution of potassium hydroxide; the reaction mixture was stirred for 1 hour under an atmosphere of nitrogen at 0° C.; the mixture was neutralized with acetic acid and the methanol distilled under reduced pressure. The residue was triturated with water and the solid collected, washed with water, dried and recrystallized from ethyl acetate-methanol, thus producing 16α,17α - isopropylidenedioxy-2,19 - cyclo - allopregnane-11β,21-diol-3,20-dione (Cpd. No. 192).

The Compounds Nos. 29 to 54, inclusive, were treated in accordance with the above procedure, thus affording respectively:

Cpd. No.:

(193) 2,19-cyclo-allopregnane-11β,17α,21-triol-3,20-dione,
(194) 16α-methyl-2,19-cyclo-allopregnane-11β,17α,21-triol-3,20-dione,
(195) 16α,17α-isopropylidenedioxy-2,19-cyclo-Δ⁴-pregnane-11β,21-diol-3,20-dione,
(196) 2,19-cyclo-Δ⁴-pregnene-11β,17α,21-triol-3,20-dione,
(197) 16α-methyl-2,19-cyclo-Δ⁴-pregnene-11β,17α,21-triol-3,20-dione,
(198) 6β-chloro-16α,17α-isopropylidenedioxy-2,19-cyclo-Δ⁴-pregnene-11β,21-diol-3,20-dione,
(199) 6β-chloro-2,19-cyclo-Δ⁴-pregnene-11β,17α,21-triol-3,20-dione,
(200) 6β-chloro-16α-methyl-2,19-cylco-Δ⁴-pregnene-11β,17α,21-triol-3,20-dione,
(201) 6β-fluoro-16α,17α-isopropylidenedioxy-2,19-cyclo-Δ⁴-pregnene-11β,21-diol-3,20-dione,
(202) 6β-fluoro-2,19-cyclo-Δ⁴-pregnene-11β,17α,21-triol-3,20-dione,
(203) 6β-fluoro-16α-methyl-2,19-cyclo-Δ⁴-pregnene-11β,17α,21-triol-3,20-dione,
(204) 6α-chloro-16α,17α-isopropylidenedioxy-2,19-cyclo-Δ⁴-pregnene-11β,21-diol-3,20-dione,
(205) 6α-chloro-2,19-cyclo-Δ⁴-pregnene-11β,17α,21-triol-3,20-dione,
(206) 6α-chloro-16α-methyl-2,19-cyclo-Δ⁴-pregnene-11β,17α,21-triol-3,20-dione,
(207) 6α-fluoro-16α,17α-isopropylidenedioxy-2,19-cyclo-Δ⁴-pregnene-11β,21-diol-3,20-dione,
(208) 6α-fluoro-2,19-cyclo-Δ⁴-pregnene-11β,17α,21-triol-3,20-dione,
(209) 6α-fluoro-16α-methyl-2,19-cyclo-Δ⁴-pregnene-11β,17α,21-triol-3,20-dione,
(210) 6-chloro-16α,17α-isopropylidenedioxy-2,19-cyclo-Δ⁴,⁶ pregadiene-11β,21-diol-3,20-dione,
(211) 6-chloro-2,19-cyclo-Δ⁴,⁶-pregnadiene-11β,17α,21-triol-3,20-dione,
(212) 6-chloro-16α-methyl-2,19-cyclo-Δ⁴,⁶-pregnadiene-11β,17α,21-triol-3,20-dione,
(213) 6-fluoro-16α,17α-isopropylidenedioxy-2,19-cyclo-Δ⁴,⁶-pregnadiene-11β,21-diol-3,20-dione,
(214) 6-fluoro-2,19-cyclo-Δ⁴,⁶-pregnadiene-11β,17α,21-triol-3,20-dione,
(215) 6-fluoro-16α-methyl-2,19-cyclo-Δ⁴,⁶-pregnadiene-11β,17α,21-triol-3,20-dione,
(216) 16α,17α-isopropylidenedioxy-2,19-cyclo-Δ⁴,⁶-pregnadiene-11β,21-diol-3,20-dione,
(217) 2,19-cyclo-Δ⁴,⁶-pregnadiene-11β,17α,21-triol-3,20-dione,
(218) 16α-methyl-2,19-cyclo-Δ⁴,⁶-pregnadiene-11β,17α,21-triol-3,20-dione,

*Example VIII*

The Compounds Nos. 111 to 137, inclusive, were treated according to Example VII, thus giving respectively:

Cpd. No.:

(219) 16α,17α-isopropylidenedioxy-2,19-cyclo-allopregnan-21-ol-3,11,20-trione,
(220) 2,19-cyclo-allopregnane-17α,21-diol-3,11,20-trione,
(221) 16α-methyl-2,19-cyclo-allopregnane-7α,21-diol-3,11,20-trione,
(222) 16α,17α-isopropylidenedioxy-2,19-cyclo-Δ⁴-pregnen-21-ol-3,11,20-trione,
(223) 2,19-cyclo-Δ⁴-pregnene-17α,21-diol-3,11,20-trione,
(224) 16α-methyl-2,19-cyclo-Δ⁴-pregnene-17α,21-diol-3,11,20-trione,
(225) 6β-chloro-16α,17α-isopropylidenedioxy-2,19-cyclo-Δ⁴-pregnen-21-ol-3,11,20-trione,
(226) 6β-chloro-2,19-cyclo-Δ⁴-pregnene-17α,21-diol-3,11,20-trione,
(227) 6β-chloro-16α-methyl-2,19-cyclo-Δ⁴-pregnene-17α,21-diol-3,11,20-trione,
(228) 6β-fluoro-16α,17α-isopropylidenedioxy-2,19-cyclo-Δ⁴-pregnen-21-ol-3,11,20-trione,
(229) 6β-fluoro-2,19-cyclo-Δ⁴-pregnene-17α,21-diol-3,11,20-trione,
(230) 6β-fluoro-16α-methyl-2,19-cyclo-Δ⁴-pregnene-17α,21-diol-3,11,20-trione,
(231) 6α-chloro-16α,17α-isopropylidenedioxy-2,19-cyclo-Δ⁴-pregnen-21-ol-3,11,20-trione,
(232) 6α-chloro-2,19-cyclo-Δ⁴-pregnene-17α,21-diol-3,11,20-trione,
(233) 6α-chloro-16α-methyl-2,19-cyclo-Δ⁴-pregnene-17α,21-diol-3,11,20-trione,
(234) 6α-fluoro-16α,17α-isopropylidenedioxy-2,19-cyclo-Δ⁴-pregnen-21-ol-3,11,20-trione,
235) 6α-fluoro-2,19-cyclo-Δ⁴-pregnene-17α,21-diol-3,11,20-trione,
(236) 6α-fluoro-16α-methyl-2,19-cyclo-Δ⁴-pregnene-17α,21-diol-3,11,20-trione,
(237) 6-chloro-16α,17α-isopropylidenedioxy-2,19-cyclo-Δ⁴,⁶-pregnadien-21-ol-3,11,20-trione,
(238) 6-chloro-2,19-cyclo-Δ⁴,⁶-pregnadiene-17α,21-diol-3,11,20-trione,
(239) 6-chloro-16α-methyl-2,19-cyclo-Δ⁴,⁶-pregnadiene-17α,21-diol-3,11,20-trione,
(240) 6-fluoro-16α,17α-isopropylidenedioxy-2,19-cyclo-Δ⁴,⁶-pregnadien-21-ol-3,11,20-trione,
(241) 6-fluoro-2,19-cyclo-Δ⁴,⁶-pregnadiene-17α,21-diol-3,11,20-trione,
(242) 6-fluoro-16α-methyl-2,19-cyclo-Δ⁴,⁶-pregnadiene-17α,21-diol-3,11,20-trione,
(243) 16α,17α-isopropylidenedioxy-2,19-cyclo-Δ⁴,⁶-pregnadien-21-ol-3,11,20-trione,
(244) 2,19-cyclo-Δ⁴,⁶-pregnadiene-17α,21-diol-3,11,20-trione,
(245) 16α-methyl-2,19-cyclo-Δ⁴,⁶-pregnadiene-17α,21-diol-3,11,20-trione,

*Example IX*

The Compounds Nos. 57 to 110, inclusive, and Nos. 138 to 191, inclusive, were treated in accordance with Example VII, thus giving the corresponding free 21-alcohols.

*Example X*

A mixture of 1 g. of 16α,17α-isopropylidenedioxy-2,19-cyclo - allopregnane - 11β,21 - diol - 3,20 - dione (Cpd. No. 192), 4 cc. of pyridine and 2 cc. of caproic anhydride was kept at room temperature overnight, poured into ice water, the formed precipitate was filtered, washed with water and dried. Crystallization from acetone-hexane gave 16α,17α - isopropylidenedioxy - 2,19-cyclo - allopregnane-11β,21-diol-3,20-dione 21 caproate (Cpd. No. 246).

The Compounds Nos. 193 to 245, inclusive, were treated according to the above procedure, to produce the corresponding 21-caproates.

*Example XI*

1 g. of 16α,17α - isopropylidenedioxy - 2,19 - cyclo - allopregnane-11β,21-diol-3,20-dione (Cpd. No. 192) was heated on the steam bath with 100 cc. of 80% acetic acid under nitrogen for 7 hours, it was then concentrated under vacuum to a small volume and poured into water. The precipitate was collected, washed well with water, dried and recrystallized from acetone-hexane, thus furnishing 2,19 - cyclo - allopregnane - 11β,16α,17α,21 - tetrol-3,20-dione (Cpd. No. 247).

Following the same procedure there were treated the Compounds Nos. 195, 204, 207, 210, 213, 216, 219, 222, 231, 237, and 243, thus producing respectively:

Cpd.
No.:

(248) 2,19-cyclo-Δ⁴-pregnene-11β,16α,17α,21-tetrol-3,20-dione,
(249) 6α-chloro-2,19-cyclo-Δ⁴-pregnene-11β,16α,17α,21-tetrol-3,20-dione,
(250) 6α-fluoro-2,19-cyclo-Δ⁴-pregnene-11β,16α,17α,21-tetrol-3,20-dione,
(251) 6-chloro-2,19-cyclo-Δ⁴,⁶-pregnadiene-11β,16α,17α,21-tetrol-3,20-dione,
(252) 6-fluoro-2,19-cyclo-Δ⁴,⁶-pregnadiene-11β,16α,17α,21-tetrol-3,20-dione,
(253) 2,19-cyclo-Δ⁴,⁶-pregnadiene-11β,16α,17α,21-tetrol-3,20-dione,
(254) 2,19-cyclo-allopregnane-16α,17α,21-triol-3,11,20-trione,
(255) 2,19-cyclo-Δ⁴-pregnene-16α,17α,21-triol-3,11,20-trione,
(256) 6α-chloro-2,19-cyclo-Δ⁴-pregnene-16α,17α,21-triol-3,11,20-trione,
(257) 6 chloro-2,19-cyclo-Δ⁴,⁶-pregnadiene-16α,17α,21-triol-3,11,20-trione,
(258) 2,19-cyclo-Δ⁴,⁶-pregnadiene-16α,17α,21-triol-3,11,20-trione,

*Example XII*

The Compounds Nos. 57, 60, 84, and 105 were treated according to the procedure described in Example XI, thus affording the corresponding free 16α,17α-diols.

*Example XIII*

The Compounds Nos. 247, 248 and 249 were treated in accordance with Example X, thus giving respectively:

Cpd.
No.:

(259) 2,19 - cyclo - allopregnane - 11β,16α,17α,21 - tetrol-3,20-dione 16,21-dicaproate,
(260) 2,19 - cyclo - Δ⁴ - pregnene - 11β,16α,17α,21 - tetrol-3,20-dione, 16,21-dicaproate,
(261) 6α - chloro - 2,19 - cyclo - Δ⁴ - pregnene - 11β,16α,17α,21-tetrol-3,20-dione 16,21-dicaproate.

*Example XIV*

A mixture of 1 g. of Compound No. 247, 50 cc. of freshly distilled acetophenone and 0.5 cc. of 72% perchloric acid was stirred at room temperature for 1 hour. The resulting mixture was washed with sodium bicarbonate solution and with water to neutrality, then it was steam distilled and the product extracted with methylene chloride. The extract was dried over anhydrous sodium sulfate and evaporated to dryness. Crystallization from acetone-hexane yielded the 16,17-acetophenonide of 2,19-cyclo - allopregnane - 11β,16α,17α,21 - tetrol - 3,20 - dione (Cpd. No. 262).

By the same procedure, there were obtained the 16,17-acetophenonides of Compounds Nos. 248 to 258, inclusive.

I claim:
1. A compound of the following formula:

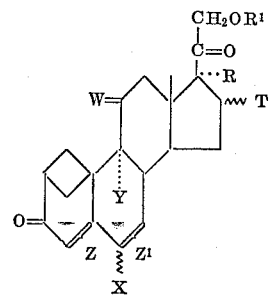

wherein Y is selected from the group consisting of hydrogen, fluorine and chlorine; W is selected from the group consisting of a β-hydroxyl group and a keto group; X is a member of the group consisting of hydrogen, α-fluorine, β-fluorine, α-chlorine and β-chlorine; Z is selected from the group consisting of a double bond and a saturated linkage between C-4 and C-5; Z¹ is selected from the group consisting of a double bond and a saturated linkage between C-6 and C-7, and when Z is a saturated linkage, Z¹ is a saturated linkage; R is a hydroxyl group; T is selected from the group consisting of hydrogen, α-hydroxyl, α-hydrocarbon carboxylic acyloxy group of less than 12 carbon atoms, α-methyl and β-methyl; T and R together form the group

in the 16α,17α-positions wherein R² and R³ are selected from the group consisting of hydrogen and a hydrocarbon residue of up to 8 carbon atoms; and R¹ is selected from the group consisting of hydrogen and hydrocarbon carboxylic acyl group of less than 12 carbon atoms.

2. 21 - acetoxy - 16α,17α - isopropylidenedioxy - 2,19-cyclo-allopregnan-11β-ol-3,20-dione.

3. 21 - acetoxy - 2,19 - cyclo - allopregnane - 11β,17α-diol-3,20-dione.

4. 21 - acetoxy - 16α - methyl - 2,19 - cyclo - allopregnane-11β,17α-diol-3,20-dione.

5. 21 - acetoxy - 16α,17α - isopropylidenedioxy - 2,19-cyclo-Δ⁴-pregnen-11β-ol-3,20-dione.

6. 21 - acetoxy - 2,19 - cyclo - Δ⁴ - pregnene - 11β,17α-diol-3,20-dione.

7. 21 - acetoxy - 16α - methyl - 2,19 - cyclo - Δ⁴ - pregnene-11β,17α-diol-3,20-dione.

8. 21 - acetoxy - 16α,17α - isopropylidenedioxy - 2,19-cyclo-allopregnane-3,11,20-trione.

9. 21 - acetoxy - 16α - methyl - 2,19 - cyclo-allopregnan-17α-ol-3,11,20-trione.

10. 21 - acetoxy - 2,19 - cyclo - allopregnan - 17α - ol-3,11,20-trione.

11. 21 - acetoxy - 2,19 - cyclo - Δ⁴ - pregnen - 17α - ol-3,11,20-trione.

12. 21 - acetoxy - 16α - methyl - 2,19 - cyclo - Δ⁴ - pregnen-17α-ol-3,11,20-trione.

13. 21 - acetoxy - 16α,17α - isopropylidenedioxy - 2,19-cyclo-Δ⁴-pregnene-3,11,20-trione.

14. 21 - acetoxy - 6α,9α - dichloro - 16α,17α - isopropylidenedioxy-2,19-cyclo-Δ⁴-pregnen-11β-ol-3,20-dione.

15. 21 - acetoxy - 6α - fluoro - 9α - chloro - 16α,17α- isopropylidenedioxy - 2,19-cyclo -$\Delta^4$ -pregnen-11$\beta$ - ol - 3,20-dione.

16. 21 - acetoxy - 6$\alpha$ - chloro - 9$\alpha$ - fluoro - 16$\alpha$,17$\alpha$-isopropylidenedioxy - 2,19 - cyclo - $\Delta^4$ - pregnen - 11$\beta$ - ol- 3,20-dione.

17. 21 - acetoxy - 6$\alpha$,9$\alpha$ - difluoro - 16$\alpha$,17$\alpha$ - isopropylidenedioxy - 2,19 - cyclo - $\Delta^4$ - pregnen - 11$\beta$ - ol - 3,20-dione.

18. 21 - acetoxy - 6$\alpha$,9$\alpha$ - dichloro - 2,19 - cyclo - $\Delta^4$-pregnen-17$\alpha$-ol-3,11,20-trione.

19. 21 - acetoxy - 6$\alpha$,9$\alpha$ - dichloro - 16$\alpha$ - methyl - 2,19-cyclo-$\Delta^4$-pregnen-17$\alpha$-ol-3,11,20-trione.

20. 21 - acetoxy - 6$\alpha$ - fluoro - 9$\alpha$ - chloro - 16$\alpha$ - methyl-2,19-cyclo-$\Delta^4$-pregnen-17$\alpha$-ol-3,11,20-trione.

No references cited.